United States Patent [19]

Batich et al.

[11] Patent Number: 4,728,694

[45] Date of Patent: Mar. 1, 1988

[54] PROCESS FOR MAKING HYDROPHILIC POLYETHYLENE

[75] Inventors: Christopher D. Batich; Ali Yahiaoui, both of Gainesville, Fla.

[73] Assignee: University of Florida, Gainesville, Fla.

[21] Appl. No.: 47,218

[22] Filed: May 8, 1987

[51] Int. Cl.$^4$ ............................................. C08L 51/06
[52] U.S. Cl. ................................... 525/246; 525/296; 525/333.7; 525/333.8; 525/360; 525/904
[58] Field of Search ........................ 525/246, 904, 296

[56] References Cited

U.S. PATENT DOCUMENTS

| | | | |
|---|---|---|---|
| 3,458,597 | 7/1969 | Jabloner et al. | 525/904 |
| 3,752,868 | 8/1973 | Kaku et al. | 525/296 |
| 4,080,405 | 3/1978 | Agouri et al. | 525/296 |

FOREIGN PATENT DOCUMENTS 649105  9/1962  Canada ................................ 525/246

*Primary Examiner*—Carman J. Seccuro
*Attorney, Agent, or Firm*—Thomas C. Saitta

[57] ABSTRACT

A process for grafting acrylamide onto the surface of low density polyethylene (LDPE). The LDPE is first oxidized by a chromic acid solution and then reduced with diborane to produce a hydroxyl-rich surface. Acrylamide is then grafted onto the surface of the LDPE by free-radical initiation, resulting in a hydrophilic polyacrylamide layer covalently bonded to the LDPE. The process has no effect on the bulk properties of the LDPE.

15 Claims, No Drawings

PROCESS FOR MAKING HYDROPHILIC POLYETHYLENE

BACKGROUND AND SUMMARY OF THE INVENTION

Surface structure and composition play a major role in defining many of the physical properties and ultimate uses of solid organic polymers. In engineering and biomedical applications, features such as wetting, weathering, adhesion, friction, electrostatic charging, permeation, biocompatibility, and bacterial fouling are largely dependent on surface properties.

Surface properties determine the value in use of many solid materials. These properties are as critical as such bulk parameters as strength, elongation, Young's modulus, etc. Furthermore, full utilization of bulk properties is often supported by surface characteristics which are mainly dependent on surface energetics (e.g., surface tension). This is particularly the case for fibers, films, membranes or other forms where the surface area/volume ratio is large.

There is much interest in modifying the surface of common polymers to make them more hydrophilic. Examples of benefits of such modification include wettable surfaces for dye adsorption, better adhesion to metal films, enzyme immobilization, weathering, blood compatibility and less tissue damage for intraocular lenses. However, most methods used involve creating a thin oxidized layer of the base polymer by plasma or flame treatment or by generating polymers near the surface which may be only physically adsorbed, e.g., radiation grafting. Both methods can cause damage to the bulk properties (e.g., tensile strength) and yield a variable and poorly characterized surface attachment.

Low density polyethylene (LDPE) is the largest volume plastic produced in the world. However, it has a slick, oily surface upon production which is hydrophobic. For many of the reasons given above, it would be highly advantageous to form a hydrophilic surface on LDPE without affecting any of the bulk properties. The process of this invention accomplishes such a goal.

The invention comprises a process whereby LDPE in various forms (film, fiber, granule, powder) is treated to produce a surface that is highly hydrophilic. The process results in a LDPE substrate with acrylamide grafted onto the surface by covalent bonds. The process involves first oxidizing the surface of LDPE, then reducing to form an hydroxyl-rich surface, and finally graft polymerizing acrylamide to the surface through free-radical initiation. The oxidation step is performed by exposure to chromic acid, the reduction step by exposure to diborane. The step of graft polymerization is performed using ceric ammonium nitrate as a free-radical initiator.

It is known in the art to oxidize LDPE by chromic acid. D. Dwight, in *Chemtech*, p. 166, March, 1982 and J. R. Rasmussen, et al., in *J. Amer. Chem. Soc.*, 99, 4736 and 4746 (1977), review the technique and provide optimum conditions to maximize carbonyl production and reduce bulk damage. It is also known to use free-radical initiation, including the use of ceric ammonium nitrate, to graft polymerize vinyl monomers onto hydroxyl-bearing surfaces. See, for example, the article by G. Mino et al., *J. Polym. Sci.*, 122, 242 (1958). Prior art, however, teaches the use of this technique on substrates that are swollen with solvent, thereby affecting the bulk properties of the substrate. The grafting performed by the process of the present invention occurs only on the surface, as the substrate is non-swollen during the grafting step.

U.S. Pat. No. 4,080,405 to Agouri et al. discloses a process for chemical modification of polyolefins by grafting polar monomers to the polyolefin in an aqueous dispersion by means of a free-radical generator. Acrylamide is taught as a possible monomer and polyethylene is taught as a possible substrate. However, the teachings of Agouri et al. differ from the present invention in that Agouri et al. teaches solution polymerization. In solution polymerization, the polymer (e.g., polyacrylamide) forms in the solution and is then grafted by physical adsorption onto the surface of the substrate. Solution polymerization results in a much larger weight gain than the method of the invention and much weaker bonding. The method of Agouri et al. also requires additional additives and is performed entirely at elevated temperatures, with a swollen substrater, thus affecting the bulk properties of the substrate. This invention calls for performance of the graft polymerization step at room temperature.

Other U.S. Patents of possible interest are U.S. Pat. Nos. 3,796,773 to Coleman, 3,652,730 to Favie et al. and 3,644,581 to Knaack.

It is the general object of this invention to produce LDPE having a hydrophilic surface.

It is a further object of this invention to produce LDPE having a hydrophilic surface by a method which affects only the surface properties of the LDPE.

It is a further object of this invention to produce LDPE having a hydrophilic surface more stable and durable than that produced by alternate methods.

It is a further object of this invention to produce LDPE with acrylamide grafted onto the surface by covalent bonding to form a stable, durable hydrophilic surface.

DETAILED DESCRIPTION OF THE INVENTION

LDPE in the form of film, fiber, granule or powder is first cleaned of impurities. The surface of the LDPE sample is then oxidized by exposure to a solution of chromic acid. This results in a surface rich in carbonyl groups. After rinsing and drying, the LDPE sample is then exposed to a diborane solution, resulting in a surface rich in hydroxyl groups. Again the sample is rinsed and dried. Finally, the sample is exposed to a solution containing acrylamide and a free-radical initiator.

The invention is best described by the following detailed example. LDPE film, 4 mil in thickness with 0.918 density and 0.25 melt index, is cut into 2×5 cm samples. The sample is extracted in a soxhlet apparatus with 2-propanol for 18 hours, then dried in vacuum at 50° C. for 4 hours, in order to provide a clean, pure sample.

The sample is placed in a solution of chromium trioxide, water and concentrated sulfuric acid in a 3:4:3 ratio by weight. The oxidation reaction is best performed at 72° C. for 5 minutes. Typically 50 ml of chromic acid solution is used. The sample is removed from the chromic acid solution and placed in a 70% $HNO_3$ solution at 50° C. for 15 minutes to remove any organic impurities from the surface. The sample is then thoroughly washed in deionized water at 50° C., rinsed with acetone and dried in vacuum for 4 hours.

To generate hydroxyl groups on the surface, the sample is covered, under nitrogen atmosphere, with a solution of 1.0 M diborane in tetrahydrofuran and allowed to stand for 18 hours at room temperature. The sample is then removed and rinsed with tetrahydrofuran (twice), methanol, 4N sulfuric acid (50° C., twice), water (twice) and finally acetone. This results in the complete removal of carbonyl groups from the surface of the sample. The sample is dried under vacuum for 4 hours.

The LDPE sample is now placed in 40 ml of distilled water which has been degassed for 20 minutes by $N_2$ purge. To this is added the appropriate amount of acrylamide (0.5 mol/l) and ceric ammonium nitrate (0.005 mol/l). The ceric ammonium nitrate provides $Ce^{4+}$ ions which act as a free-radical initiators. After purging for 10 minutes more, the reaction is allowed to proceed at room temperature for 18 hours. Extractions in a soxhlet with methnol, DMF and water were then performed on the sample to remove any residual monomer and physically adsorbed homopolymer.

The process results in a LDPE film with acrylamide grafted to the surface by covalent bonding. The grafting occurs on non-swollen LDPE, such that the acrylamide is covalently bonded to the surface with no effect on the bulk of the LDPE.

Samples prepared by the process discussed above were characterized using FT-IR/ATR spectrums and XPS analysis. The FT-IR/ATR analysis showed an intense amide peak in the 1690–1550 $cm^{-1}$ region and another intense peak at 1125 $cm^{-1}$ corresponding to the ether group by which polyacrylamide is attached to the substrate. Extensive extraction with various solvents decreased only slightly the amide peak, illustrating a strong, stable bond. Quantitative XPS analysis confirms that substantial grafting has occurred. The values indicate that a polyacrylamide layer of roughly 40 Angstroms is present.

We claim:

1. A process for producing hydrophilic polyethylene comprising the grafting of acrylamide to polyethylene by:
   A. oxidizing the surface of said polyethylene to form a carbonyl-rich surface;
   B. reducing the carbonyl-rich surface to form an hydroxyl-rich surface; and
   C. exposing said hydroxyl-rich surface to acrylamide monomer in the presence of a free-radical initiator.

2. The process of claim 1, where the step of oxidizing is performed by exposing said polyethylene to a chromic acid solution.

3. The process of claim 2, where the chromic acid solution comprises three parts chromium trioxide, three parts concentrated sulfuric acid and four parts water.

4. The process of claim 2, where the step of oxidizing is performed for approximately 5 minutes at approximately 72° C.

5. The process of claim 1, where the step of reducing is performed by exposing the polyethylene to a diborane solution.

6. The process of claim 5, where said diborane solution comprises 1 M diborane in tetrahydrofuran.

7. The process of claim 5, where the step of reducing is performed for approximately 18 to 24 hours at room temperature.

8. The process of claim 1, where said free-radical initiator consists essentially of ceric ammonium nitrate in aqueous solution.

9. The process of claim 8, where the ceric ammonium nitrate concentration is approximately 0.5 mole per liter and the acrylamide monomer concentration is approximately 0.005 mole per liter.

10. The process of claim 1, where said polyethylene is in film, fiber, powder or granule form.

11. The process of claim 1, where said polyethylene is non-swollen.

12. A process for producing hydrophilic polyethylene comprising grafting acrylamide to the surface of said polyethylene by:
   A. contacting said polyethylene with a solution comprising three parts chromium trioxide, three parts sulfuric acid and four parts water for approximately 5 minutes at approximately 72° C.;
   B. removing said polyethylene from said solution and contacting said polyethylene with a solution comprising 70% nitric acid for approximately 15 minutes at approximately 50° C.;
   C. removing, rinsing and drying in vacuum said polyethylene;
   D. contacting said polyethylene with a solution comprising 1 M diborane in tetrahydrofuran for approximately 18 to 24 hours at room temperature;
   E. removing, rinsing, and drying in vacuum said polyethylene; and
   F. placing said polyethylene in a solution comprising ceric ammonium nitrate, acrylamide monomer and water for approximately 18 hours at room temperature.

13. The process of claim 12, where said polyethylene is in the form of film, fibers, granules or powder.

14. The process of claim 12, where the ceric ammonium nitrate and acrylamide monomer present in aqueous solution are in concentrations of approximately 0.5 mole per liter of ceric ammonium nitrate and 0.005 mole per liter of acrylamide monomer.

15. The process of claim 12, where the polyethylene is low density polyethylene.

* * * * *